US009548859B2

(12) United States Patent
Medvinsky

(10) Patent No.: US 9,548,859 B2
(45) Date of Patent: Jan. 17, 2017

(54) TICKET-BASED IMPLEMENTATION OF CONTENT LEASING

(75) Inventor: Alexander Medvinsky, San Diego, CA (US)

(73) Assignee: Google Technology Holdings LLC, Mountain View, CA (US)

(*) Notice: Subject to any disclaimer, the term of this patent is extended or adjusted under 35 U.S.C. 154(b) by 779 days.

(21) Appl. No.: 12/327,326

(22) Filed: Dec. 3, 2008

(65) Prior Publication Data
US 2010/0138903 A1 Jun. 3, 2010

(51) Int. Cl.
G06F 7/04 (2006.01)
H04L 29/06 (2006.01)
H04L 9/08 (2006.01)
G06F 21/10 (2013.01)
H04L 9/32 (2006.01)

(52) U.S. Cl.
CPC ............ *H04L 9/0822* (2013.01); *G06F 21/10* (2013.01); *H04L 9/083* (2013.01); *H04L 9/3213* (2013.01); *H04L 63/0807* (2013.01); *G06F 2221/0753* (2013.01); *H04L 2209/60* (2013.01); *H04L 2463/101* (2013.01)

(58) Field of Classification Search
CPC .............. H04L 2209/80; H04L 63/062; H04L 63/0807; H04L 9/083; H04L 9/16; H04L 9/3213
USPC .......................................................... 726/10
See application file for complete search history.

(56) References Cited

U.S. PATENT DOCUMENTS 7,243,366 B2 7/2007 Medvinsky et al.
2003/0063752 A1 4/2003 Medvinsky et al.
2003/0093694 A1* 5/2003 Medvinsky et al. .......... 713/201
2003/0149880 A1 8/2003 Shamsaasef et al.
2004/0128499 A1* 7/2004 Peterka .................. H04L 63/062
713/155
2005/0027700 A1 2/2005 Turner et al.
2005/0091164 A1* 4/2005 Varble ..................... G06F 21/10
705/52
2006/0059342 A1 3/2006 Medvinsky et al.
(Continued)

OTHER PUBLICATIONS

PCT Search Report & Written Opinion, RE: Application #PCT/US2009/064109 Jun. 22, 2010.
(Continued)

*Primary Examiner* — Ashok Patel
*Assistant Examiner* — Gary Gracia
(74) *Attorney, Agent, or Firm* — Fenwick & West LLP

(57) ABSTRACT

The present invention is a method and system for accessing digital content stored on a computing device. An agreement between a subscriber and a content provider allows the subscriber to lease the digital content from the content provider, and download the digital content from a content server operated by the content provider. The method retrieves a service ticket for the computing device, and retrieves content rights for the digital content. The service ticket includes authorization data, and a session key, where the authorization data include authorized subscription services for the computing device. The content rights include required subscription services for the digital content and are delivered authenticated with the session key. The method allows access to the digital content when the authorized subscription services included with the authorization data match the required subscription services included with the content rights.

18 Claims, 5 Drawing Sheets

(56) References Cited

U.S. PATENT DOCUMENTS

| | | | |
|---|---|---|---|
| 2006/0143133 A1 | 6/2006 | Medvinsky | |
| 2006/0242069 A1* | 10/2006 | Peterka .................. | G06F 21/10 705/50 |
| 2007/0157295 A1* | 7/2007 | Mangalore et al. .............. | 726/6 |
| 2007/0179898 A1* | 8/2007 | Medvinsky et al. ............ | 705/59 |
| 2007/0185815 A1* | 8/2007 | Boccon-Gibod ....... | G06F 21/10 705/51 |
| 2007/0226365 A1* | 9/2007 | Hildreth ............... | G11B 27/034 709/231 |
| 2008/0098212 A1* | 4/2008 | Helms et al. .................. | 713/155 |
| 2008/0216145 A1* | 9/2008 | Barton ................ | H04N 7/1675 725/131 |
| 2009/0287583 A1* | 11/2009 | Holmes ............. | G06F 17/30861 705/26.1 |
| 2010/0058485 A1* | 3/2010 | Gonzalez ................ | G06F 21/10 726/27 |
| 2010/0067705 A1* | 3/2010 | Boccon-Gibod ....... | G06F 21/10 380/285 |

OTHER PUBLICATIONS

Menezes, C., et al., "Handbook of Applied Cryptography," Jan. 1, 1997, pp. 490-491, 500-501, 548-555, CRC Press LLC, USA.
Extended European Search Report for European Patent Application No. EP 09830824.0, May 12, 2014, 7 Pages.

\* cited by examiner

TICKET-BASED IMPLEMENTATION OF CONTENT LEASING

BACKGROUND

A typical content leasing scenario involves a subscriber and a content provider. The subscriber agrees to pay the content provider for the right to access and use digital content associated with a service provided by the content provider. The digital content includes digital media such as audio, video, and images, or any combination thereof. The content provider agrees to allow the subscriber to download and use the digital content on her playback devices, such as a computer, telephone, mobile device, or the like, as long as she is subscribed to the service provided by the content provider. When the subscriber cancels the subscription, digital rights management (DRM) technology renders the digital content issued under the subscription agreement, and that she downloaded to her playback devices, unusable. There is a need for a content leasing system that allows the subscriber to reinstate a canceled subscription agreement so that the digital content issued under the canceled subscription agreement, and downloaded to playback devices, becomes usable once again by the subscriber.

A prior art solution to allow the digital content to become playable once again implements this content usage model with the help of "root" and "leaf" content licenses. A root license represents a subscription, while a leaf license represents an individual piece of stored content. Since a leaf license "chains" to a root license, license verification requires the validation of both the leaf license and the root license. If the root license is expired, then all leaf licenses that chained to it also expire. Thus, when a user renews her subscription, she obtains a new root license. The advantage of this prior art solution is that it does not require the user to re-acquire every single "leaf" license for every piece of content when she renews the subscription. However, this prior art solution only works when the infrastructure (e.g., a license server) is aware of a license identifier for at least the root licenses stored on the device because that license identifier would allow leaf licenses to chain to the root license.

Internet Protocol Rights Management (IPRM) is a prior art DRM ticket-based architecture that delivers digital content over an Internet Protocol (IP) network as described in U.S. Published Patent Application Number 2003/0093694 (granted as U.S. Pat. No. 7,243,366), the disclosure of which is incorporated herein by reference. In an IPRM architecture, the infrastructure is not aware of content license identifiers. An IPRM content server (i.e., license server) securely supplies a set of content rights, including a content key, and the device itself locally creates and encrypts content rights with a rights identifier that is unique only within that one device. So, another solution is needed for use within IPRM that takes advantage of the existing IPRM ticket-based architecture and does not require additional messaging to be defined or additional new objects to be stored on a device just to implement this feature.

Thus, there is a demand for a system and method for accessing digital content stored on a computing device. The presently disclosed invention satisfies this demand.

SUMMARY

Aspects of the present invention provide a method and system for accessing digital content stored on a computing device. In an embodiment, an agreement between a subscriber and a content provider allows the subscriber to lease the digital content from the content provider, and download the digital content from a content server operated by the content provider. The method retrieves a service ticket for the computing device, and retrieves content rights for the digital content. The service ticket includes authorization data, and a session key, where the authorization data include authorized subscription services for the computing device. The content rights include required subscription services for the digital content and are delivered authenticated with the session key. The method allows access to the digital content when the authorized subscription services included with the authorization data match the required subscription services included with the content rights.

DETAILED DESCRIPTION

Figure 1:
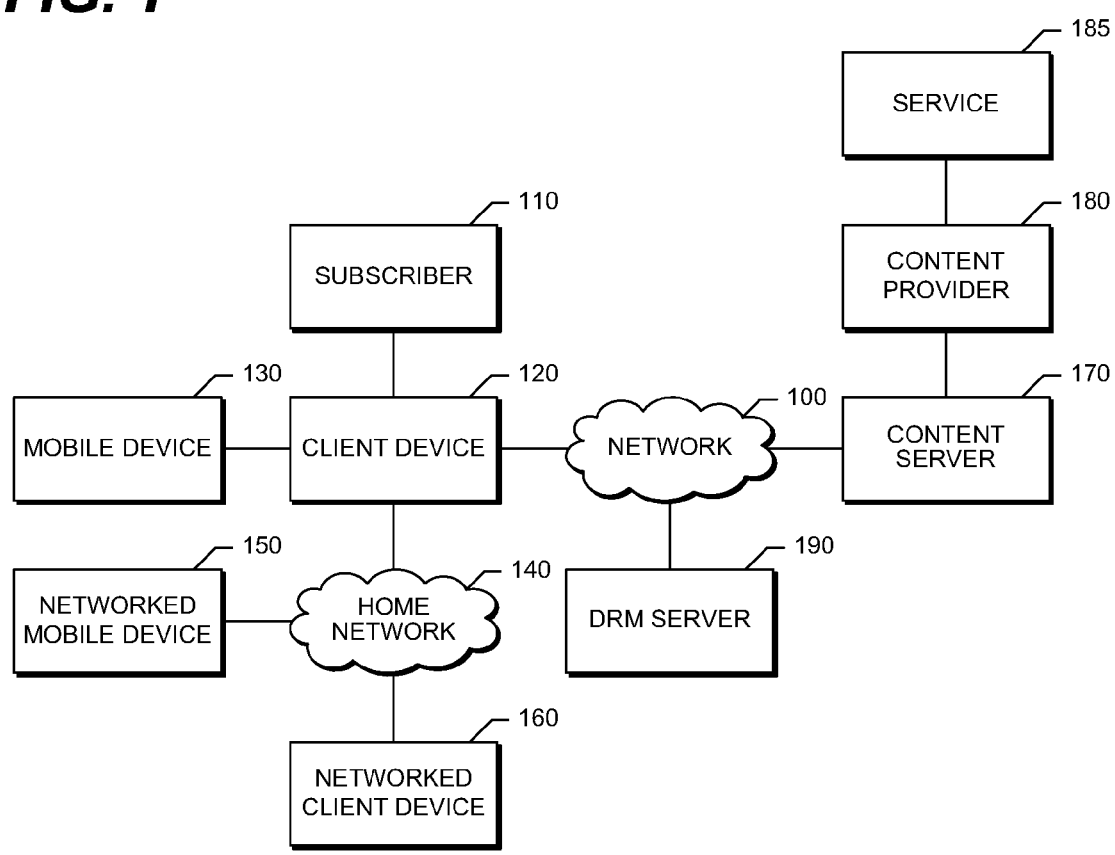
FIG. 1 is network diagram that illustrates one embodiment of the hardware components of a system that performs the present invention in an IPRM architecture.

FIG. 1 is network diagram that illustrates one embodiment of the hardware components of a system that performs the present invention in an IPRM architecture. As shown in FIG. 1, a client device 120 connects to a content server 170 via a network 100. A subscriber 110 operates the client device 120 to subscribe to a service 185 that a content provider 180 provides via the content server 170. Once subscribed to the service 185, the subscriber 110 may access and download digital content offered under the service 185 by the content provider 180. In one embodiment, the subscriber 110 operates the client device 120 to download the content to the client device 120. In another embodiment, the client device 120 connects to a mobile device 130, such as a digital video recorder, portable audio or video media player, portable hard drive, or the like, and the subscriber 110 operates the mobile device 130 to retrieve the content from the client device 120 and download the content to the mobile device 130. In yet another embodiment, the client device 120 utilizes a home network 140 to connect to networked devices, such as a networked client device 160, networked mobile device 150, or the like, and the subscriber 110 operates the networked devices to retrieve the content from the client device 120 and download the content to the networked devices. The client device 120 also connects to a digital rights management (DRM) server 190 via the network 100. The subscriber 110 operates the client device 120 to obtain content rights, including a content key, and a list of subscribed services from the DRM server 190 to access and download digital content offered by another content provider (not shown). The DRM server 190 utilizes a conditional access or DRM architecture other than IRPM.

The network 100 shown in FIG. 1 is a communication network that connects and enables data transfer between the client device 120 and the content server 170. In one embodiment, the network 100 is a public communication network. The present invention also contemplates the user of comparable network architectures. Comparable network architectures include the Public Switched Telephone Network (PSTN), a public packet-switched network carrying data and voice packets, a wireless network, a private network, and the like. A wireless network includes a cellular network (e.g., a Time Division Multiple Access (TDMA) or Code Division Multiple Access (CDMA) network), a satellite network, a wireless Local Area Network (LAN) (e.g., a wireless fidelity (Wi-Fi) network), and the like. A private network includes a LAN, a Personal Area Network (PAN) such as a Bluetooth network, a wireless LAN, a Virtual Private Network (VPN), an intranet, an extranet, and the like. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organizations network. The system also contemplates network architectures and protocols such as Ethernet, Token Ring, Systems Network Architecture, Internet Protocol, Transmission Control Protocol, User Datagram protocol, Asynchronous Transfer Mode, proprietary network protocols comparable to the Internet Protocol, and the like.

The home network 140 shown in FIG. 1 is a communication network that connects and enables data transfer between the client device 120 and the networked mobile device 150 and networked client device 160. In one embodiment, the home network 140 is a public communication network similar to the network 100. In another embodiment, the home network 140 is a private communication network.

Figure 2:
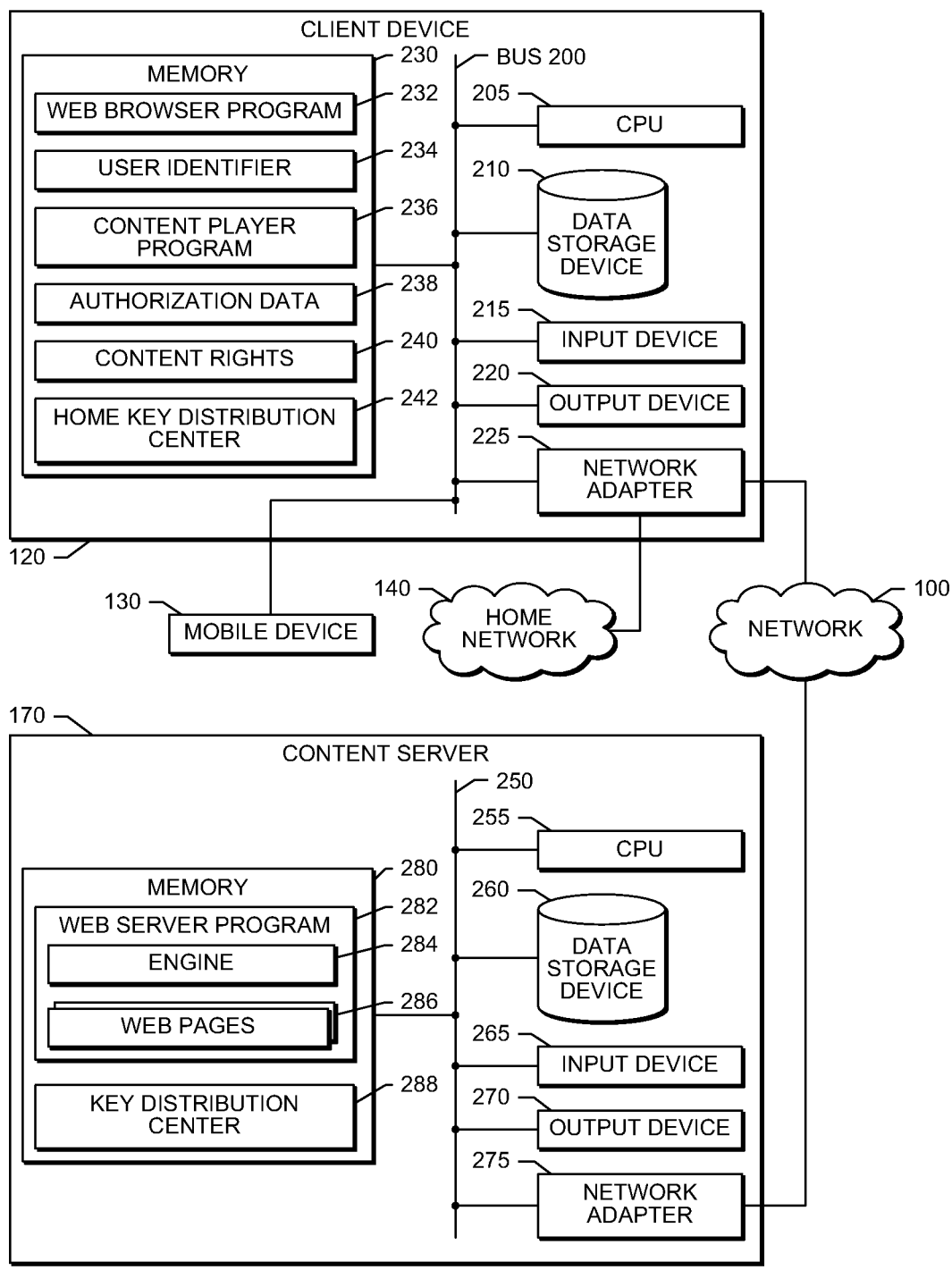
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the client device 120, and content server 170.

As shown in FIG. 2, the client device 120 is a general-purpose computer, such as a laptop computer, mobile computer, desktop computer, or the like. In another embodiment, the client device 120 is a set-top box, information appliance, or the like. A bus 200 is a communication medium that connects a central processor unit (CPU) 205, data storage device 210 (such as a disk drive, flash drive, flash memory, or the like), input device 215 (such as a keyboard, keypad, touchscreen, or the like), output device 220 (such as a monitor, graphic display, or the like), network adapter 225, memory 230, and mobile device 130. The network adapter 225 transmits and receives network traffic for the client device 120. In one embodiment, the network adapter 225 connects to the network 100 and is the mechanism that facilitates the passage of network traffic between the client device 120 and the network 100. In another embodiment, the network adapter 225 connects to the home network 140 and is the mechanism that facilitates the passage of network traffic between the client device 120 and the home network 140.

The CPU 205 performs the disclosed methods by executing the sequences of operational instructions that comprise each computer program resident in, or operative on, the memory 230. The reader should understand that the memory 230 may include operating system, administrative, and database programs that support the programs disclosed in this application. In one embodiment, the configuration of the memory 230 of the client device 130 includes a web browser program 232, user identifier 234, content player program 236, authorization data 238, content rights 240, and home key distribution center program 242. The web browser program 232 displays web pages on the output device 220. In one embodiment, the user identifier 234 is stored in a file referred to as a cookie. The content server 170 may assign and send the user identifier 234 to the client device 120 once when the client device 120 first communicates with the content server 170. From then on, the client device 120 includes the user identifier 234 with all messages sent to the content server 170 so the content server 170 can identify the source of the message. The content player program 236 accesses the authorization data 238, and content rights 240, including a content key, when playing back protected content. The content player program 236 and home key distribution center program 242 perform the method of the present invention disclosed in detail in FIG. 3, FIG. 4, and FIG. 5. These computer programs store intermediate results in the memory 230, or data storage device 210. In another embodiment, the memory 230 may swap these programs, or portions thereof, in and out of the memory 235 as needed, and thus may include fewer than all of these programs at any one time.

As shown in FIG. 2, the content server 170 is a general-purpose computer that provides server functionality, such as file services, web page services, or the like. In another embodiment, the content server 170 is a network appliance, or the like. A bus 250 is a communication medium that connects a central processor unit (CPU) 255, data storage device 260 (such as a disk drive, flash drive, flash memory, or the like), input device 265 (such as a keyboard, keypad, touchscreen, or the like), output device 270 (such as a monitor, graphic display, or the like), network adapter 275, and memory 280. The network adapter 275 transmits and receives network traffic for the content server 170. In one embodiment, the network adapter 275 connects to the network 100 and is the mechanism that facilitates the passage of network traffic between the content server 170 and the network 100.

The CPU 255 performs the disclosed methods by executing the sequences of operational instructions that comprise each computer program resident in, or operative on, the memory 280. The reader should understand that the memory 280 may include operating system, administrative, and database programs that support the programs disclosed in this application. In one embodiment, the configuration of the memory 280 of the content server 170 includes a web server program 282, and key distribution center 288. The web server program 282 includes an engine 284, and web pages 286. The engine 282 receives web server request messages sent by the web browser 232 on the client device 120, and serves the web pages 286 in response to those requests. The key distribution center 288 performs the method of the present invention disclosed in detail in FIG. 3, FIG. 4, and FIG. 5. These computer programs store intermediate results in the memory 280, or data storage device 260. In another embodiment, the memory 280 may swap these programs, or portions thereof, in and out of the memory 280 as needed, and thus may include fewer than all of these programs at any one time.

In the IPRM architecture shown in FIG. 1 and FIG. 2, the key distribution center (KDC) 288 in the infrastructure issues each client device 120 a ticket that includes Authorization Data which lists client entitlements, including a list of subscription services, if the user's credit card number is registered (to allow Pay-Per-View purchases without a subscription), client's geographical location, etc.

The Authorization Data in the ticket is encrypted and is not decipherable to the client device 120—only the content server 170 (i.e., license server) that authenticates the client device 120 is capable of decrypting that copy of the Authorization Data in the ticket. However, an IPRM client also receives another copy of that same Authorization Data in the same message (an AS Request or TGS Request) that the client device 120 can decrypt and interpret. For the purpose of this embodiment, a client is required to store its copy of the Authorization Data in a secure software or hardware-based module that is safe from unauthorized tampering, such as data storage device 210, or the authorization data 238 that is resident in the memory 230.

An IPRM client, such as the client device 120 obtains a content rights and key from the content server 170 (i.e., license server), typically as part of a Key Reply message. The client device 120 then writes those rights out to a content rights secure storage, such as data storage device 210 or the content rights 240 resident in the memory 230. When the client device 120 attempts to validate those rights, and determine whether the client device 120 is authorized to play the content, it (1) checks whether the rights are bound to a list of one or more Subscription Services, such as the service 185 provided by the content provider 180, with specific names or identifiers; and (2) checks whether the client device 120 has a valid (non-expired) ticket with Authorization Data 238 that includes one of those Subscription Services. If the answer to these checks is yes, the client device 120 can play the content. Otherwise, the subscription has expired and the content is no longer usable.

Figure 3:
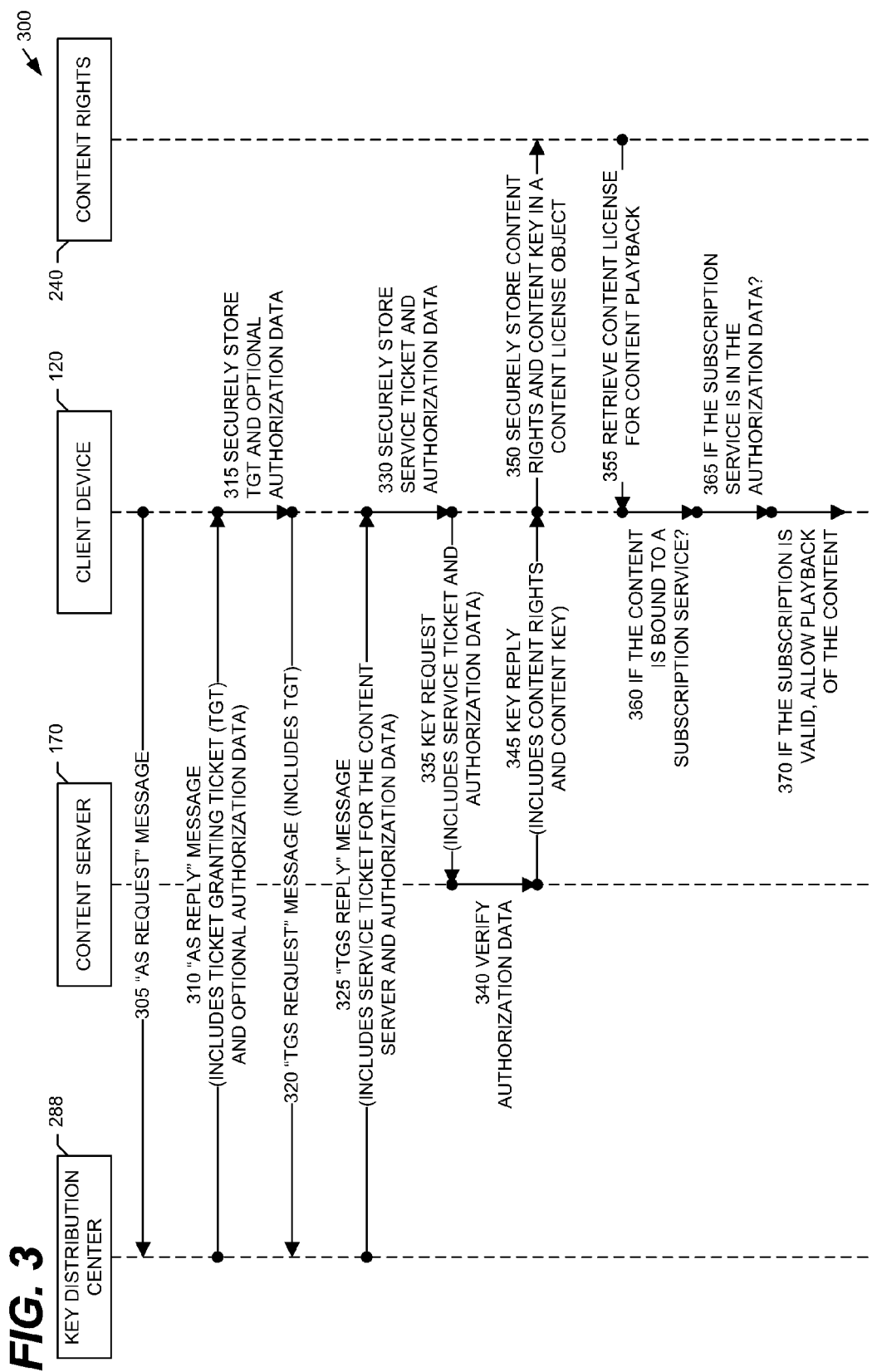
FIG. 3 is a message flow diagram that illustrates a method for accessing digital content according to an embodiment of the present invention.

FIG. 3 is a message flow diagram that illustrates one embodiment of the method of the present invention. In particular, FIG. 3 illustrates the communication between the key distribution center 288, content server 170, client device 120, and content rights 240 store, as shown in FIG. 1 and FIG. 2.

The ticket-based content leasing process 300 shown in FIG. 3 begins with the client device 120 sending an IPRM AS Request message to the KDC 288 on the content server 170 (step 305). The KDC 288 receives the AS Request message, and generates an IPRM ticket granting ticket (TGT) and authorization data. In another embodiment, the KDC 288 only generates a TGT and defers the generation of authorization data until later. The KDC 288 sends an AS Reply message to the client device 120 (step 310) that includes the TGT and, optionally, authorization data. The client device 120 receives the AS Reply message to obtain the TGT and authorization data including a list of authorized subscription services. The client device 120 stores the TGT and, optionally, authorization data in a secure location (step 315), such as data storage device 210 or the authorization data 238 that is resident in the memory 230. At some later time, the client device 120 sends a ticket granting server (TGS) Request message to the KDC 288 (step 320) that includes the TGT. The KDC 288 receives the TGS Request message, and generates a service ticket for the specific content server 170. The service ticket for the content server 170 contains authorization data, either transferred from the TGT, or inserted based on information in a subscriber database accessible via the content server 170, and a session key. The authorization data includes a list of authorized subscriptions services for the client device 120. The session key is used to encrypt the content key included with the content rights 240 sent to the client device 120. The KDC 288 sends a TGS Reply message to the client device 120 (step 325) that includes the service ticket for the content server 170 and the authorization data. In another embodiment, the AS Reply message (step 310) may return the service ticket for the content server 170 directly, rather than returning the TGT, thus making the TGS Request message (step 320) and TGS Reply message (step 325) optional. After the client device 120 receives the service ticket, it stores the service ticket and authorization data in a secure location (step 330). In another embodiment, the client device 120 retrieves the TGT and authorization data from the secure location because the TGT and authorization data was previously requested and stored in the secure location.

Referring again to FIG. 3, at some later time, the client device 120 sends a key request message to the content server 170 (step 335), that includes the service ticket and authorization data, to request content rights and a content key to decrypt and play back specific content. After receiving the key request message, the content server 170 verifies the authorization data (step 340). If the authorization data is not verified, or the authorization data does not include the necessary subscription service for this content, the ticket-based content leasing process 300 ends. If the authorization data is verified, and contains the necessary subscription service for this content, the content server 170 sends a key reply message to the client device 120 (step 345) that includes the content rights and content key. The client device 120 receives the key reply message, and stores the content rights and content key in a secure location (step 350), such as data storage device 210 or the content rights 240 that is resident in the memory 230. In another embodiment, the client device 120 obtains the content key and rights in an encrypted form (not shown). In various embodiments, the client device 120 may download a pre-encrypted file over HTTP or FTP, or the client device 120 could receive and then record an encrypted RTP-based or MPEG-2 transport-based content stream.

Referring again to FIG. 3, at some later time, the client device 120 retrieves the content rights from secure storage (step 355) in order to play back the content. The client device 120 checks whether the content is bound to any subscription service (step 360). If it is, the client device 120 extracts the required subscriptions from the content rights and checks them against the client device 120 current (non-expired) authorization data (step 365). If one of those subscription services is still listed in the authorization data, the client device 120 is allowed to playback the content (step 370).

In another embodiment, the client device 120 may be provisioned with a number of different content providers and may have obtained a number of service tickets with different authorization data from different KDCs. In this embodiment, the client device 120 compares the subscriptions inside the content rights against multiple sets of authorization data obtained from different KDCs (step 365). If any one of those sets of authorization data contains a subscription services that matches the license, the client is allowed to play back the content (step 370).

In another embodiment, each subscription service listed in the authorization data uniquely identifies the service 185 or content provider 180, for example, by including a service provider identifier with a service identifier. Thus, the service identifiers in the authorization data are globally unique to allow for differentiation of authorization data that may come from multiple service 185 or content providers 180.

In another embodiment, the ticket-based content leasing can extend to other devices on a home network 140. After content rights have been obtained by one device (which communicates with the infrastructure KDC 288), typically a user would be allowed to share that content with other devices that are owned by the same user (i.e., registered with the same home network 140). An IPRM architecture is designed to support such content sharing within the home network 140.

There is a demand for a further extension to IPRM to support the sharing of leased content within that same home network 140. Normally, service tickets with authorization data are given out only by an infrastructure KDC 288 for client devices 120 that purchase content from a content provider 180. In this case, all devices on the home network 140 need access to the same authorization data in order to be able to render leased content (available only during an active subscription).

The device that gives out service tickets to the devices on the home network 140 is the home KDC 242. Assuming that the home KDC 242 is the same device that obtains service tickets from the infrastructure KDC 288, the extension is for the home KDC 242 to propagate its own authorization data obtained from the infrastructure KDC 288 into all of the service tickets issued to the devices in the home network 140.

Figure 4:
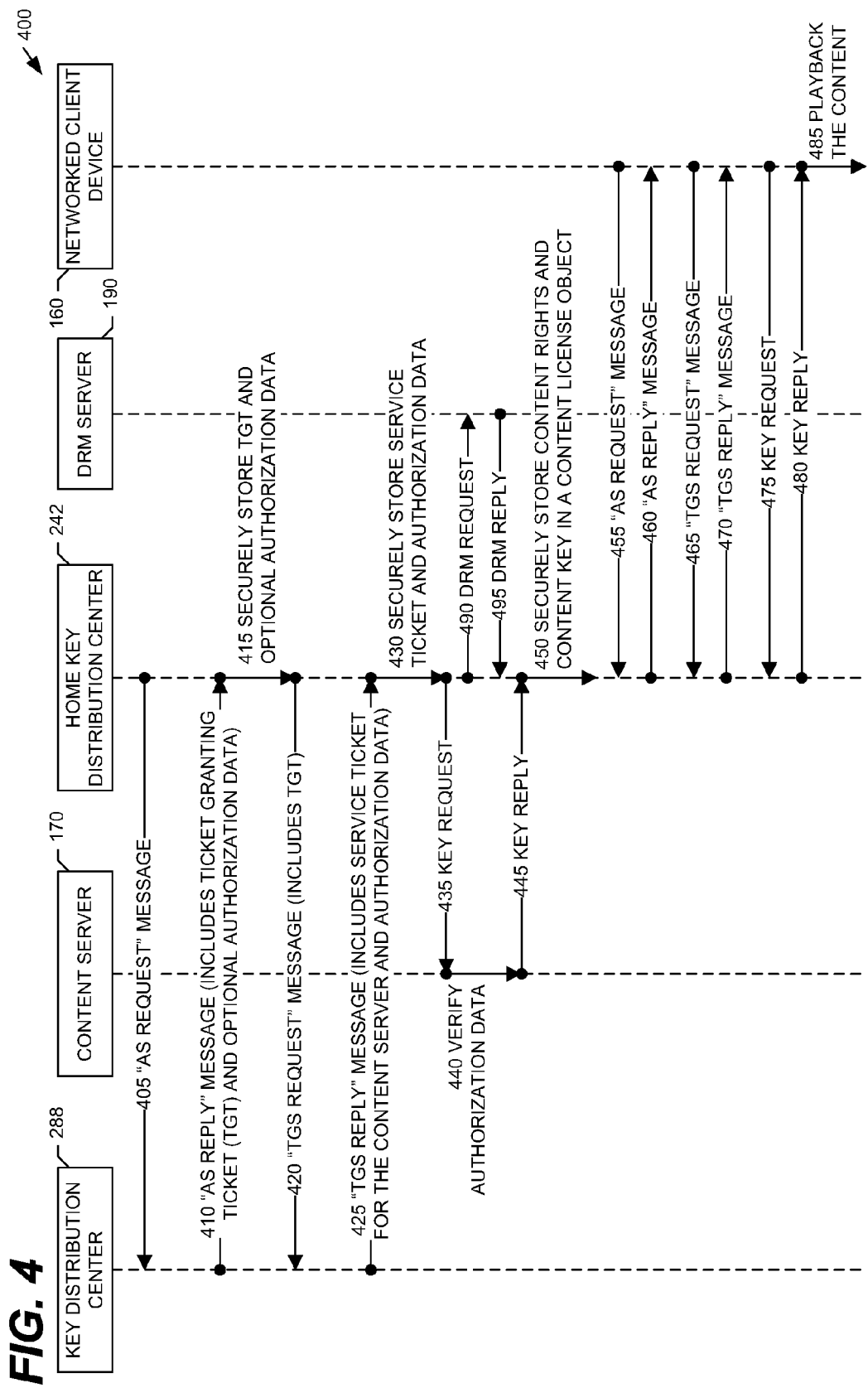
FIG. 4 is a message flow diagram that illustrates a method for accessing digital content according to an embodiment of the present invention.

FIG. 4 is a message flow diagram that illustrates one embodiment of the method of the present invention. In particular, FIG. 4 illustrates the communication between the key distribution center 288, content server 170, home key distribution center 242, and networked client device 160, as shown in FIG. 1 and FIG. 2.

The home network 140 ticket-based content leasing process 400 shown in FIG. 4 is similar to the ticket-based content leasing process 300 shown in FIG. 3. The home network 140 ticket-based content leasing process 400 begins with the home KDC 242 on the client device 120 sending an IPRM AS Request message to the KDC 288 on the content server 170 (step 405). The KDC 288 receives the AS Request message, and generates an IPRM ticket granting ticket (TGT) and an authorization data. In another embodiment, the KDC 288 only generates a TGT and defers the generation of authorization data until later. The KDC 288 sends an AS Reply message to the home KDC 242 (step 410) that includes the TGT and, optionally, authorization data. The home KDC 242 receives the AS Reply message to obtain the TGT and authorization data including a list of subscription services. The home KDC 242 stores the TGT and, optionally, authorization data in a secure location (step 415), such as data storage device 210 or the authorization data 238 that is resident in the memory 230. At some later time, the home KDC 242 sends a ticket granting server (TGS) Request message to the KDC 288 (step 420) that includes the TGT. The KDC 288 receives the TGS Request message, and generates a service ticket for the specific content server 170. The service ticket for the content server 170 contains authorization data either transferred from the TGT, or inserted based on information in a subscriber database accessible via the content server 170. The authorization data includes a list of subscriptions services for the home KDC 242. The KDC 288 sends a TGS Reply message to the home KDC 242 (step 425) that includes the service ticket for the content server 170 and the authorization data. In another embodiment, the AS Reply message (step 410) may return the service ticket for the content server 170 directly, rather than returning the TGT, thus making the TGS Request message (step 420) and TGS Reply message (step 425) optional. After the home KDC 242 receives the service ticket, it stores the service ticket and authorization data in a secure location (step 430).

Referring again to FIG. 4, at some later time, the home KDC 242 sends a key request message to the content server 170 (step 435), that includes the service ticket and authorization data, to request content rights and a content key to decrypt and play back specific content. After receiving the key request message, the content server 170 verifies the authorization data (step 440). If the authorization data is not verified, or the authorization data does not include the necessary subscription service for this content, the home network 140 ticket-based content leasing process 400 ends. If the authorization data is verified, and contains the necessary subscription service for this content, the content server 170 sends a key reply message to the home KDC 242 (step 445) that includes the content rights and content key. The home KDC 242 receives the key reply message, and stores the content rights and content key in a secure location (step 450), such as data storage device 210 or the content rights 240 that is resident in the memory 230. In another embodiment, the home KDC 242 obtains the content key and rights in an encrypted form (not shown). In various embodiments, the home KDC 242 may download a pre-encrypted file over HTTP or FTP, or the home KDC 242 could receive and then record an encrypted RTP-based or MPEG-2 transport-based content stream.

Optionally, the home KDC 242 shown in FIG. 4 may obtain the content rights, including the content key, and the list of subscribed services from another DRM server 190. In this scenario, the home KDC 242 sends a DRM request message to the DRM server 190 (step 490) for the content rights to play the specific content. The DRM server 190 receives the request and sends a DRM reply message to the home KDC 242 (step 495) that supplies the content rights, including the content key. The subscriber 110 had previously requested a list of subscribed services from the DRM server 190 and the list was sent to the home KDC 242 using a secure interface. The home KDC 242 stores the content rights, including the content key, and list of subscribed services received from the DRM system 190 in a secure location (step 450), such as data storage device 210 or the content rights 240 that is resident in the memory 230. In this scenario, the DRM request and reply messages (steps 490 and 495) replace the message exchange described above between the home KDC 242 and KDC 288 and content server 170 (steps 405 through 445).

Referring again to FIG. 4, the AS Request, AS Reply, TGS Request, TGS Reply, Key Request, and Key Reply messages between the networked client device 160 and the home KDC 242 are the same as the messages between the home KDC 242 and KDC 288 (steps 405 through 445). Thus, at some later time, one of the devices on the home network 140, such as the networked client device 160 sends an AS Request message to the home KDC 242 on the client device 120 (step 455). The home KDC 242 receives the AS Request message, and retrieves the service ticket and authorization data from secure storage. The home KDC 242 sends an AS Reply message to the networked client device 160 (step 460) that includes the service ticket and authorization data. Optionally, in another embodiment, the networked client device 160 gets a TGT back in the AS Reply message, then sends a TGS Request message to the home KDC 242 (step 465) and gets the service ticket back in the TGS Reply message from the home KDC 242 (step 470). The networked client device 160 then sends a key request message (step 475) to the home KDC 242 that includes the service ticket and a content identifier. The home KDC 242 sends back the corresponding content rights, including a content key, in a key reply (step 480). The networked client device 160 uses the content rights to playback the content (step 485). In one embodiment, the home KDC 242 is a home media server that enables portable and transparent access to digital content stored on any connected device in the home.

Thus, the home KDC 242 issues a service ticket to the networked client device 160 with a copy of its own authorization data obtained earlier from an infrastructure KDC 288. This authorization data includes a list of subscription services that would allow the home KDC 242 to access leased content. When the networked client device 160 attempts to play back the content (step 485), it first has to check that the authorization data (obtained in step 460) contains at least one subscription service that is present in the corresponding content rights. If no such subscription service is found, the networked client device 160 will refuse to play back this content.

Since the home KDC 242 could have service tickets from multiple infrastructure KDCs 288 with several sets of authorization data, the home KDC 242 has to combine them into one authorization data object, before returning it to the networked client device 160. Each source of authorization data will include a corresponding expiration timestamp extracted from the service ticket issued by an infrastructure KDC 288. Individual parts of the combined authorization data will become invalid after each one expires.

The home network 140 scenario is more complicated in the case that the home KDC 242 is not the device that is registered with the infrastructure KDC 288 and is not the device that originally acquires purchased content. Content can be distributed by any device on the home network 140 to any other device on the home network 140 if the content rights allow it. But, authorization data is typically distributed only by the home KDC 242.

Figure 5:
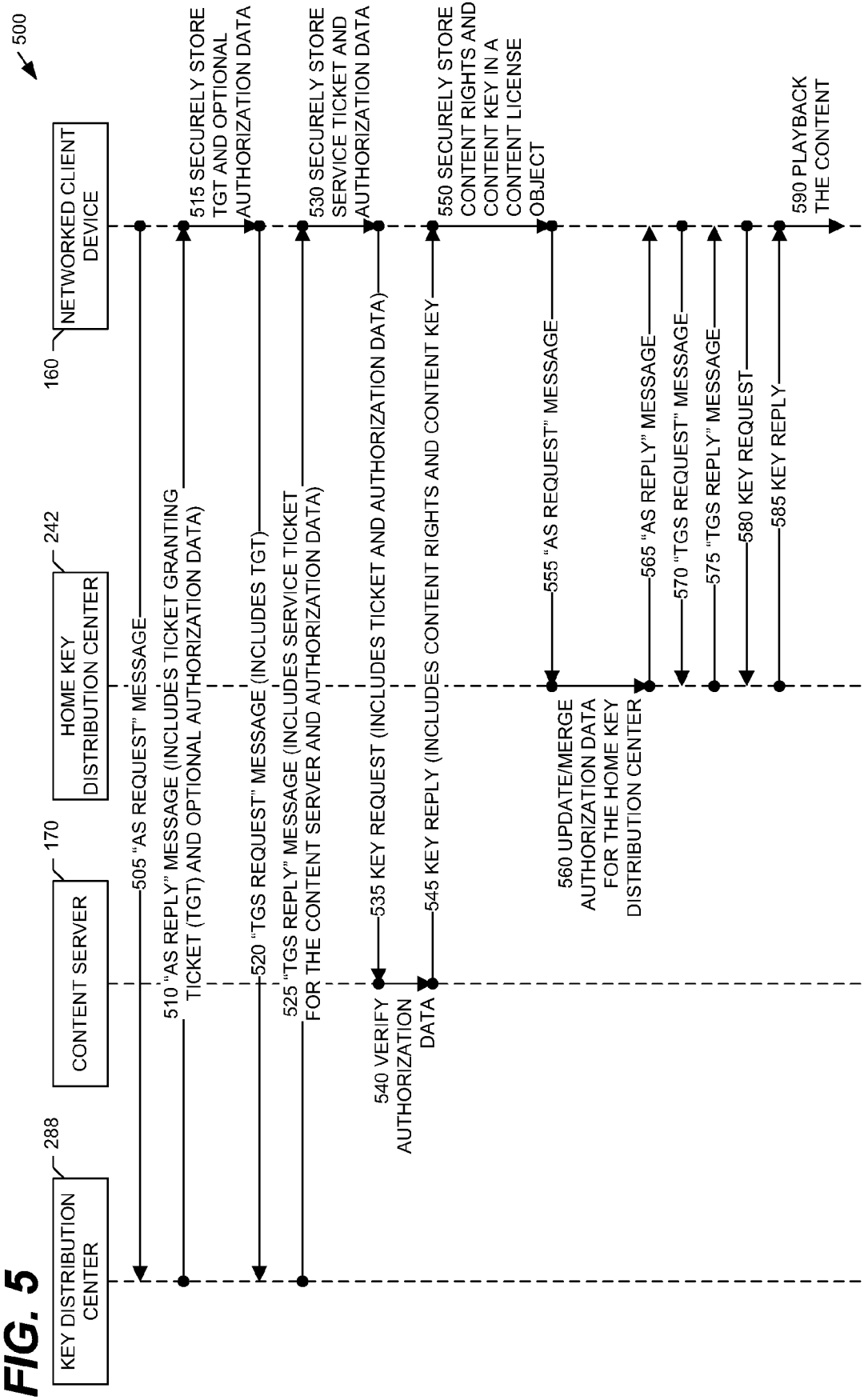
FIG. 5 is a message flow diagram that illustrates a method for accessing digital content according to an embodiment of the present invention.

FIG. 5 is a message flow diagram that illustrates one embodiment of the method of the present invention. In particular, FIG. 5 illustrates the communication between the key distribution center 288, content server 170, home key distribution center 242, and networked client device 160, as shown in FIG. 1 and FIG. 2.

The home network 140 ticket-based content leasing process 500 shown in FIG. 5 is similar to the ticket-based content leasing process 300 shown in FIG. 3. The home network 140 ticket-based content leasing process 500 begins with the networked client device 160 sending an IPRM AS Request message to the KDC 288 on the content server 170 (step 505). The KDC 288 receives the AS Request message, and generates an IPRM ticket granting ticket (TGT) and authorization data. In another embodiment, the KDC 288 only generates a TGT and defers the generation of authorization data until later. The KDC 288 sends an AS Reply message to the networked client device 160 (step 510) that includes the TGT and, optionally, authorization data. The networked client device 160 receives the AS Reply message to obtain the TGT and authorization data including a list of subscription services. The networked client device 160 stores the TGT and, optionally, authorization data in a secure location (step 515). At some later time, the networked client device 160 sends a ticket granting server (TGS) Request message to the KDC 288 (step 520) that includes the TGT. The KDC 288 receives the TGS Request message, and generates a service ticket for the specific content server 170. The service ticket for the content server 170 contains authorization data either transferred from the TGT, or inserted based on information in a subscriber database accessible via the content server 170. The authorization data includes a list of subscriptions services for the networked client device 160. The KDC 288 sends a TGS Reply message to the networked client device 160 (step 525) that includes the service ticket for the content server 170 and the authorization data. In another embodiment, the AS Reply message (step 510) may return the service ticket for the content server 170 directly, rather than returning the TGT, thus making the TGS Request message (step 520) and TGS Reply message (step 525) optional. After the networked client device 160 receives the service ticket, it stores the service ticket and authorization data in a secure location (step 530).

Referring again to FIG. 5, at some later time, the networked client device 160 sends a key request message to the content server 170 (step 535), that includes the service ticket and authorization data, to request content rights and a content key to decrypt and play back specific content. After receiving the key request message, the content server 170 verifies the authorization data (step 540). If the authorization data is not verified, or the authorization data does not include the necessary subscription service for this content, the home network 140 ticket-based content leasing process 500 ends. If the authorization data is verified, and contains the necessary subscription service for this content, the content server 170 sends a key reply message to the networked client device 160 (step 545) that includes the content rights and content key. The networked client device 160 receives the key reply message, and stores the content rights and content key in a secure location (step 550). In another embodiment, the networked client device 160 obtains the content key and rights in an encrypted form (not shown). In various embodiments, the networked client device 160 may download a pre-encrypted file over HTTP or FTP, or the networked client device 160 could receive and then record an encrypted RTP-based or MPEG-2 transport-based content stream.

Referring again to FIG. 5, the AS Request, AS Reply, TGS Request, TGS Reply, Key Request, and Key Reply messages between the networked client device 160 and the home KDC 242 are the same as messages between the networked client device 160 and KDC 288 (steps 505 through 545). Thus, at some later time, one of the devices on the home network 140, such as the networked client device 160 sends an AS Request message to the home KDC 242 on the client device 120 (step 555). The home KDC 242 receives the AS Request message, and updates/merges the authorization data with the other authorization data already active for the home network 140 (step 560) The authorization data includes a list of subscribed services and a timestamp (i.e., the expiration time of the service ticket for the networked client device 160 or home KDC 242 issued by the infrastructure KDC 288. Even though the authorization data is updated/merged, the part that came from the networked client device 160 retains the timestamp in secure storage so that it becomes invalid after its expiration time. When the home KDC 242 receives the next AS Request message from the networked client device 160, the networked client device 160 provides the latest authorization data with an up-to-date timestamp. The home KDC 242 sends an AS Reply message to the networked client device 160 (step 565) that includes updated/merged authorization data (with the relevant timestamps). Thereafter, any other device on the home network 140 requesting a service ticket will get that same updated/merged authorization data. Optionally, in another embodiment, the networked client device 160 gets a TGT back in the AS Reply message, then sends a TGS Request message to the home KDC 242 (step 570) and gets the service ticket back in the TGS Reply message from the home KDC 242 (step 575). The networked client device 160 then sends a key request message (step 580) to the home KDC 242 that includes the service ticket and a content identifier. The home KDC 242 sends back the corresponding content rights, including a content key, in a key reply (step 585). The networked client device 160 uses the service ticket and authorization data to playback the content (step 590). In one embodiment, the home KDC 242 is a home media server that enables portable and transparent access to digital content stored on any connected device in the home.

One problem that is likely to occur is that the home KDC 242 updates its authorization data (either from an infrastructure KDC 288 or from another device, such as networked client device 160) with a list of new subscription services, but all the devices on the home network 140 are not informed.

When one of the devices on the home network 140 attempts to playback some leased content and realizes that it is missing authorization data, it should automatically request a new service ticket from the home KDC 242 that will result in the most up-to-date authorization data for the home network 140. This will enable a device on the home network 140 to recover and be able to playback the leased content without any noticeable effect to the user.

Although the disclosed exemplary embodiments describe a fully functioning system and method for accessing digital content stored on a computing device, the reader should understand that other equivalent exemplary embodiments exist. Since numerous modifications and variations will occur to those reviewing this disclosure, the system and method for accessing digital content stored on a computing device is not limited to the exact construction and operation illustrated and disclosed. Accordingly, this disclosure intends all suitable modifications and equivalents to fall within the scope of the claims.

I claim:

1. A method for accessing digital content by a mobile computing device that is available to stationary set top boxes, the mobile computing device communicating via a home network with a home key distribution center, comprising:
    retrieving a service ticket for the mobile computing device, the service ticket including authorization data that includes a first identification of at least one authorized subscription service for the mobile computing device, and a session key, that are not unique to the mobile computing device;
    retrieving, for the digital content, content rights that include a second identification of at least one subscription service that is required for access to play the stored digital content, wherein the content rights are delivered authenticated with the session key;
    validating, by the mobile computing device, that the at least one authorized subscription service identified in the authorization data is non-expired and matches the at least one required subscription service identified in the content rights;
    allowing access by the mobile computing device to play the digital content stored on the mobile computing device only if the validating is successful;
    sending a request for a home service ticket to the home key distribution center;
    receiving the home service ticket including home authorization data that consolidates the authorization data from other mobile computing devices that communicate with the home key distribution center and the session key;
    sending a key request message to the home key distribution center that includes the home service ticket and a second content identifier; and
    receiving, from the home key distribution center, second content rights corresponding to the second content identifier, wherein the home key distribution center receives the second content rights by sending a DRM request message to a DRM server for the right to play second digital content and the DRM server receives the DRM request message and sends a DRM reply message to the home key distribution center that supplies the second content rights, including a second content key;
    wherein the validating, by the mobile computing device, enforces an agreement between a subscriber and a content provider that allows the subscriber to lease the digital content from the content provider, and wherein to lease comprises a right to download, and to store in the mobile computing device, the digital content from a content server operated by the content provider.

2. The method of claim 1, wherein the retrieving of the service ticket further comprises:
    sending a request for a ticket granting ticket to a key distribution center for the content server;
    receiving the ticket granting ticket;
    storing the ticket granting ticket on the mobile computing device;
    sending a request for the service ticket to the key distribution center;
    receiving the service ticket;
    receiving the authorization data;
    storing the service ticket on the mobile computing device; and
    storing the authorization data on the mobile computing device.

3. The method of claim 1, wherein the retrieving of the content rights further comprises:
    sending a key request for the content rights to the content server, the key request including the service ticket and the authorization data;
    receiving the content rights including content rights and a content key; and
    storing the content rights on the mobile computing device.

4. The method of claim 1, wherein when the agreement between the subscriber and the content provider terminates, the allowing of access and playing the stored digital content further comprises:
    reinstating the agreement between the subscriber and the content provider to allow the subscriber to lease the digital content from the content provider.

5. The method of claim 1, wherein the home key distribution center is a media server, the method further comprising:
    sending a key request to the media server for the digital content; and
    receiving a key reply that includes the content rights for the digital content,
    wherein the mobile computing device allows access to play the digital content stored on the mobile computing device only upon validating that the at least one subscription service identified in the content rights matches the at least one authorized subscription service identified in the authorization data.

6. A system for accessing digital content by a mobile computing device that is available to stationary set top boxes, the mobile computing device communicating via a home network with a home key distribution center, comprising:

a memory device resident in the mobile computing device; and a processor disposed in communication with the memory device, the processor configured to:

retrieve a service ticket for the mobile computing device, the service ticket including authorization data that includes a first identification of at least one authorized subscription service for the mobile computing device, and a session key, that are not unique to the mobile computing device;

retrieve, for the digital content, content rights that include a second identification of at least one subscription service that is required for access to play the stored digital content, wherein the content rights are delivered authenticated with the session key;

validate, by the mobile computing device, that the at least one authorized subscription service identified in the authorization data is non-expired and matches the at least one required subscription service identified in the content rights;

allow access by the mobile computing device to play the digital content stored on the mobile computing device only if the validating is successful;

send a request for a home service ticket to the home key distribution center;

receive the home service ticket including home authorization data that consolidates the authorization data from other mobile computing devices that communicate with the home key distribution center and the session key;

send a key request message to the home key distribution center that includes the home service ticket and a second content identifier; and receive, from the home key distribution center, second content rights corresponding to the second content identifier, wherein the home key distribution center receives the second content rights by sending a DRM request message to a DRM server for the right to play second digital content and the DRM server receives the DRM request message and sends a DRM reply message to the home key distribution center that supplies the second content rights, including a second content key;

wherein the validating by the mobile computing device enforces an agreement between a subscriber and a content provider that allows the subscriber to lease the digital content from the content provider, and wherein to lease comprises a right to download, and to store in the mobile computing device, the digital content from a content server operated by the content provider.

7. The system of claim 6, wherein to retrieve the service ticket, the processor is further configured to:

send a request for a ticket granting ticket to a key distribution center for the content server;

receive the ticket granting ticket;

store the ticket granting ticket on the mobile computing device;

send a request for the service ticket to the key distribution center;

receive the service ticket;

receive the authorization data;

store the service ticket on the mobile computing device; and store the authorization data on the mobile computing device.

8. The system of claim 6, wherein to retrieve the content rights, the processor is further configured to:

send a key request for the content rights to the content server, the key request including the service ticket and the authorization data;

receive the content rights including content rights and a content key; and store the content rights on the mobile computing device.

9. The system of claim 6, wherein when the agreement between the subscriber and the content provider terminates, to allow access and play the previously stored digital content, the processor is further configured to:

reinstate the agreement between the subscriber and the content provider to allow the subscriber to lease the digital content from the content provider.

10. The system of claim 6, wherein the home key distribution center is a media server, the processor is further configured to:

send a key request to the media server for the digital content; and receive a key reply that includes the content rights for the digital content, wherein the mobile computing device allows access to play the digital content stored on the mobile computing device only upon validating the at least one subscription service identified in the content rights matches the at least one authorized subscription service identified in the authorization data.

11. A method for accessing digital content by at least one mobile computing device that is available to stationary set top boxes, each mobile computing device communicating via a home network with a home key distribution center, comprising:

retrieving a service ticket for the at least one mobile computing device from the home key distribution center, the service ticket including authorization data that includes a first identification of at least one authorized subscription service for the home key distribution center, and a session key, that are not unique to the mobile computing device;

retrieving, for the digital content, content rights from the home key distribution center, wherein the content rights include a second identification of at least one subscription service that is required for access to play the stored digital content and are delivered authenticated with the session key;

validating, by the at least one mobile computing device, that the at least one authorized subscription service identified in the authorization data is non-expired and matches the at least one required subscription service identified in the content rights;

allowing access by the at least one mobile computing device to play the digital content stored on the at least one mobile computing device only if the validating is successful;

sending a request for a home service ticket to the home key distribution center;

receiving the home service ticket including home authorization data that consolidates the authorization data from other mobile computing devices that communicate with the home key distribution center and the session key;

sending, by the at least one mobile computing device, a key request message to the home key distribution center that includes the home service ticket and a second content identifier; and receiving, from the home key distribution center by the at least one mobile computing device, second content rights corresponding to the second content identifier, wherein the home key distribution center receives the second content rights by sending a DRM request message to a DRM server for the right to play second digital content and the DRM server receives the DRM request message and sends a DRM reply message to the home key distribution center that supplies the second content rights, including a second content key;

wherein the validating by the at least one mobile computing device enforces an agreement between a subscriber and a content provider that allows the subscriber to lease the digital content from the content provider, and wherein to lease comprises a right to download, and to store in the at least one mobile computing device, the digital content from a content server operated by the content provider.

12. The method of claim 11, wherein the retrieving of the service ticket further comprises:
sending a request for the service ticket;
receiving the service ticket; and
storing the service ticket on the mobile computing device.

13. The method of claim 11, wherein the retrieving of the content rights further comprises:
sending a request for the content rights;
receiving the content rights; and
storing the content rights on the mobile computing device.

14. The method of claim 11, wherein to retrieve the content rights, the method further comprises:
sending a request for the content rights from the home key distribution center to a DRM server associated with another content provider;
receiving the content rights, and the second identification of the at least one subscription service for the digital content; and
storing the content rights, and the second identification of the at least one subscription service for the digital content on the home key distribution center.

15. A system for accessing digital content by at least one mobile computing device that is available to stationary set top boxes, each mobile computing device communicating via a home network with a home key distribution center, comprising:
a memory device resident in the at least one mobile computing device; and
a processor disposed in communication with the memory device, the processor configured to:
retrieve a service ticket for the at least one mobile computing device from the home key distribution center, the service ticket including authorization data that includes a first identification of at least one authorized subscription service for the home key distribution center, and a session key, that are not unique to the mobile computing device;
retrieve, for the digital content, content rights from the home key distribution center, wherein the content rights include a second identification of at least one subscription service that is required for access to play the stored digital content and are delivered authenticated with the session key;
validating, by the at least one mobile computing device, that the at least one authorized subscription service identified in the authorization data is non-expired and matches the at least one required subscription service identified in the content rights;
allowing access by the at least one mobile computing device to play the digital content stored on the at least one mobile computing device only if the validating is successful;
sending a request for a home service ticket to the home key distribution center;
receiving the home service ticket including home authorization data that consolidates the authorization data from other mobile computing devices that communicate with the home key distribution center and the session key;
sending, by the at least one mobile computing device, a key request message to the home key distribution center that includes the home service ticket and a second content identifier; and
receiving, from the home key distribution center by the at least one mobile computing device, second content rights corresponding to the second content identifier, wherein the home key distribution center receives the second content rights by sending a DRM request message to a DRM server for the right to play second digital content and the DRM server receives the DRM request message and sends a DRM reply message to the home key distribution center that supplies the second content rights, including a second content key;

wherein the validating by the at least one mobile computing device enforces an agreement between a subscriber and a content provider that allows the subscriber to lease the digital content from the content provider, wherein to lease comprises a right to download, and to store in the at least one mobile computing device, the digital content from a content server operated by the content provider.

16. The system of claim 15, wherein to retrieve the service ticket, the processor is further configured to:
send a request for the service ticket;
receive the service ticket; and
store the service ticket on the mobile computing device.

17. The system of claim 15, wherein to retrieve the content rights, the processor is further configured to:
send a request for the content rights;
receive the content rights; and
store the content rights on the mobile computing device.

18. The system of claim 15, wherein to retrieve the content rights, the processor is further configured to:
send a request for the content rights from the home key distribution center to a DRM server associated with another content provider;
receive the content rights, and the second identification of the at least one subscription service for the digital content; and
store the content rights, and the second identification of the at least one subscription service for the digital content on the home key distribution center.

\* \* \* \* \*